(12) United States Patent
Chiang et al.

(10) Patent No.: US 8,297,821 B2
(45) Date of Patent: Oct. 30, 2012

(54) LIGHT SOURCE MODULE AND ELECTRONIC DEVICE USING THE SAME

(75) Inventors: Fei-Yi Chiang, Taipei (TW); Te-Sen Chin, Taipei (TW); Mu-Te Chien, Taipei (TW)

(73) Assignee: Compal Electronics, Inc., Taipei (TW)

( * ) Notice: Subject to any disclaimer, the term of this patent is extended or adjusted under 35 U.S.C. 154(b) by 311 days.

(21) Appl. No.: 12/748,694

(22) Filed: Mar. 29, 2010

(65) Prior Publication Data

US 2011/0149579 A1    Jun. 23, 2011

(30) Foreign Application Priority Data

Dec. 21, 2009 (TW) .............................. 98143969 A

(51) Int. Cl.
*G02B 5/126* (2006.01)
(52) U.S. Cl. ........................................ 362/555; 362/558
(58) Field of Classification Search ................. 362/555, 362/558, 577, 311.02, 311.06
See application file for complete search history.

(56) References Cited

U.S. PATENT DOCUMENTS

| | | | |
|---|---|---|---|
| 7,339,157 B2 * | 3/2008 | Faller | 362/555 |
| 2003/0169602 A1 * | 9/2003 | Rizkin et al. | 362/558 |
| 2006/0067079 A1 * | 3/2006 | Noh et al. | 362/555 |
| 2010/0046218 A1 * | 2/2010 | Huang | 362/326 |

* cited by examiner

*Primary Examiner* — David V Bruce
(74) *Attorney, Agent, or Firm* — Thomas, Kayden, Horstemeyer & Risley, LLP

(57) ABSTRACT

Disclosed herein are a light source module and an electronic device using the same. The light source module is disposed in a housing component of the electronic device and includes a light source and a light guide element having a light-entering surface, a light-departing curved surface and a light-reflecting curved surface. The light-entering surface receives the light from the light source. The normal line directions of the light-departing curved surface are approximately perpendicular to the normal line direction of the light-entering surface. The light is reflected by the light-reflecting curved surface and then leaves the light guide element in the normal line directions of the light-departing curved surface.

14 Claims, 6 Drawing Sheets

LIGHT SOURCE MODULE AND ELECTRONIC DEVICE USING THE SAME

RELATED APPLICATIONS

This application claims priority to Taiwan Application Serial Number 98143969, filed Dec. 21, 2009, which is herein incorporated by reference.

BACKGROUND

1. Technical Field

The present invention relates to a photoelectric component and a device using the photoelectric component. More particularly, the present invention relates to a light source module and an electronic device using the light source module.

2. Description of Related Art

Along with the development of modern technology, new electronic products are constantly brought forth on the market. The functions of the electronic products are getting closer and closer to daily activities, so the practice territory of the products expands from offices to living rooms, bedrooms, and even restaurants and coffee shops.

The notebook computers on the market nowadays are lighter and thinner than earlier products, due to the advances in manufacturing techniques and miniaturization of internal components. However, since the volume of a notebook computer is reduced and its internal density increases, effectively arranging the components inside the notebook computer has become an important topic for the manufacturers.

For instance, a light signal element is disposed on the housing of a notebook computer. In order to increase the illumination quality of the light signal element, the manufacturers tend to uniformize the light from the light signal element through a combination of a light guide element and a lens. In one common design, the light is reflected by a reflecting surface of the light guide element to change its direction, and the luminance of the light is uniformized through the lens.

Commonly, the light enters and leaves the light guide element in parallel directions. In other words, the light incident direction and the light emergent direction are in the same plane. While practicing in the notebook computer, the arrangement of the light guide element and the lens is constrained due to the parallel directions of the incident light and the emergent light, and the applicability of the light guide element is limited. Particularly, in the trend of anticipating thinner and lighter products, the above-described planar optical path is not helpful to arrange the light guide element and the lens, and therefore effecting the utilization of the internal space of the notebook computer.

On the other hand, the light being uniformized through the lens still has uneven luminance with darker regions and lighter regions, thus affecting the lamination quality of the light signal element.

SUMMARY

A light source module and an electronic device using the same are provided herein, to solve the problems of constraining the disposition of the light guide element and uneven luminance of the light.

According to one aspect of the invention, a light source module including a light source and a light guide element is provided. The light guide element is disposed adjacent to the light source and has a light-entering surface, a light-departing curved surface and a light-reflecting curved surface. The normal line directions of the light-departing curved surface are approximately perpendicular to the normal line direction of the light-entering surface. The light reflected by the light-reflecting curved surface leaves the light guide element in the normal line directions of the light-departing curved surface.

In one embodiment of the invention, the light-departing curved surface is a part of a continuous circular surface, and the light-reflecting curved surface is a part of a cone surface.

In one embodiment of the invention, the light-reflecting curved surface includes a first curved surface and a second curved surface next to each other. The two curved surfaces are respectively a part of a first cone surface and a part of a second cone surface. The vertex angles of the two cone surfaces are not the same.

In one embodiment of the invention, the light-departing curved surface is a continuous circular surface, and the light-reflecting curved surface is a cone surface.

In one embodiment of the invention, the light-reflecting curved surface includes a first curved surface and a second curved surface next to each other. The two curved surfaces are respectively a first cone surface and a second cone surface. The vertex angles of the two cone surfaces are not the same.

According to another aspect of the invention, an electronic device including a housing component and a light source module is provided. A light guide element of the light source module has a light-entering surface, a light-departing curved surface and a light-reflecting curved surface. The light is reflected by the light-reflecting curved surface and then leaves the light guide element in the normal line directions of the light-departing curved surface.

In the foregoing light source module and electronic device of the invention, the light from the light source is reflected by the light-reflecting curved surface and leaves the light guide element in the normal line directions of the light-reflecting curved surface, thereby transforming the linear incident light into a three-dimensional circular emergent light. As a result, the disposition flexibility and the applicability of the light source module are increased.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
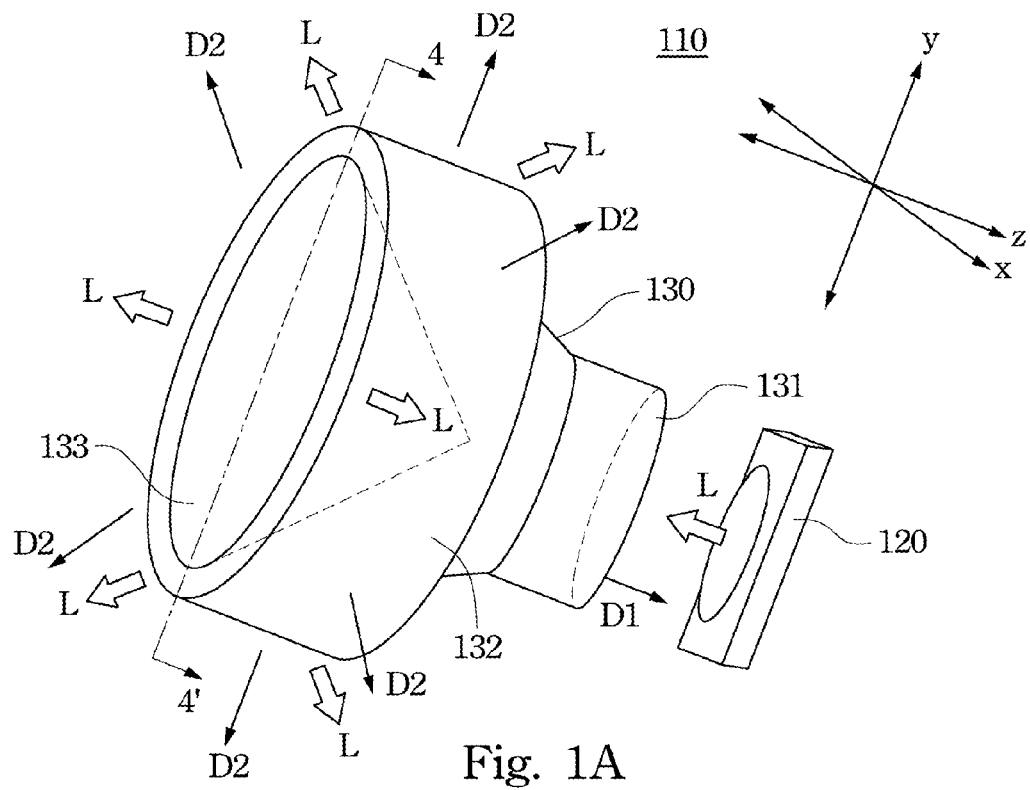
FIG. 1A is a three-dimensional diagram of a light source module according to one embodiment of the invention.

Reference will now be made in detail to the present embodiments of the invention, examples of which are illustrated in the accompanying drawings. Wherever possible, the same reference numbers are used in the drawings and the description to refer to the same or like parts.

In the embodiments of the invention, the linear incident light is transformed into three-dimensional circular emergent light and is uniformized through the light guide element. The elaboration starts with the light source module according to one embodiment of the invention.

Figure 1B:
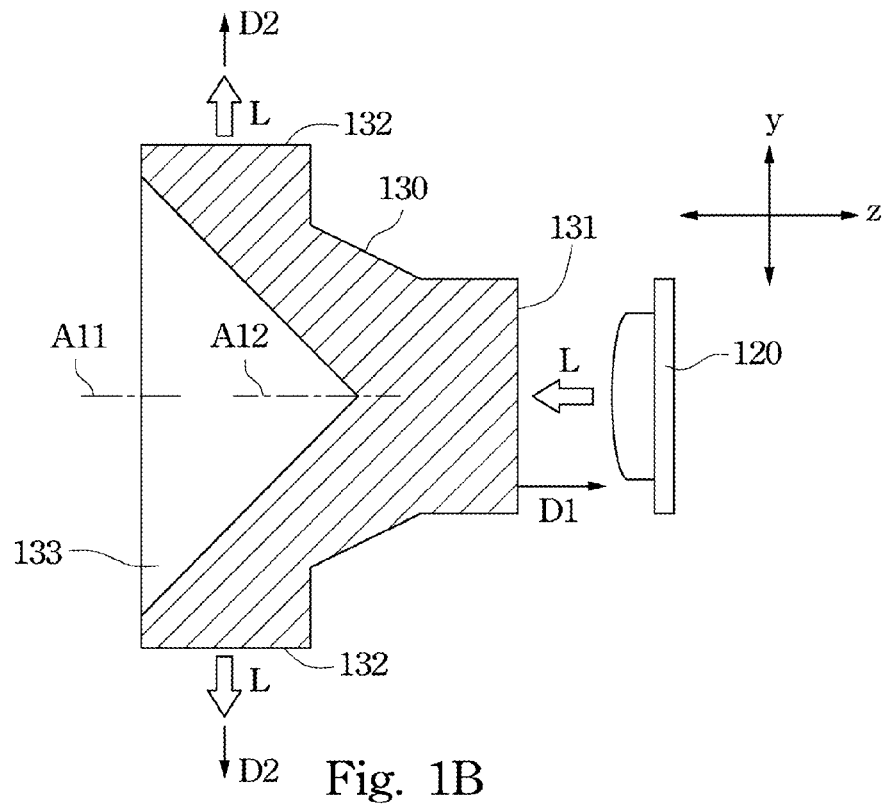
FIG. 1B is a cross-sectional view of the light guide element in FIG. 1A along line 4-4'.

FIG. 1A is a three-dimensional diagram of a light source module according to one embodiment of the invention. FIG. 1B is a cross-sectional view of the light guide element in FIG. 1A along line 4-4'. The light source module 110 includes a light source 120 and a light guide element 130. The light source 120 is disposed adjacent to the light guide element 130 for emitting light L. The light guide element 130 includes a light-entering surface 131, a light-departing curved surface 132 and a light-reflecting curved surface 133. The light-entering surface 131 and the light-departing curved surface 132 are situated on two different sides of the light guide element 130. In the present embodiment, the light guide element 130 is exemplified by including one light-reflecting curved surface 133.

The light-entering surface 131 is located on one side of the light guide element 130 for receiving light L. In other words, the light L enters the light guide element 130 through the light-entering surface 131. After entering the light guide element 130, the light L is reflected by the light-reflecting curved surface 133 and its direction is also changed. The light-departing curved surface 132 is located on another side of the light guide element 130. The reflected light L leaves the light guide element 130 through the light-departing curved surface 132.

As shown in FIG. 1A, the light L emitted by the light source 120 penetrates through the light-entering surface 131 in the normal line direction D1 of the light-entering surface 131. In the present embodiment, the light-departing curved surface 132 is a continuous circular surface of 360 degrees, and thus having numerous radial normal line directions D2. These normal line directions D2 are approximately perpendicular to the normal line direction D1 of the light-entering surface 131. As shown in FIG. 1B, the light-departing curved surface 132 has a first central axis A11 being parallel to the normal line direction D1 of the light-entering surface 131. The reflected light L leaves the light guide element 130 in the radial normal line directions D2 by penetrating through the light-departing curved surface 132. The light-reflecting curved surface 133 is a cone surface and has a second central axis A12 being parallel to the normal line direction D1 of the light-entering surface 131.

In the present embodiment, the light guide element 130 generally forms a cylindrical column, and the first central axis A11 of the light-departing curved surface 132 is aligned with the second central axis A12 of the light-reflecting curved surface 133. Exemplary, in a coordinate system formed by X, Y and Z axes, the light L enters the light guide element 130 in a direction parallel to the Z axis, and the reflected light L leaves the light guide element 130 in numerous directions parallel to the X-Y plane.

The light L entering the light guide element 130 in the normal line direction D1 of the light-entering surface 131 is transformed into a three-dimensional circular form through the light-reflecting curved surface 133. Therefore, the incident light L and the reflected emergent light L from the light-departing curved surface 132 are not in the same plane. This reduces the limitation for designing the light guide element 130, and further improves the applicability of the light source module 110. Further, by reflecting the light L into various different directions, the uniformity of the light L is enhanced and the quality of the light source module 110 is increased.

Figure 2:
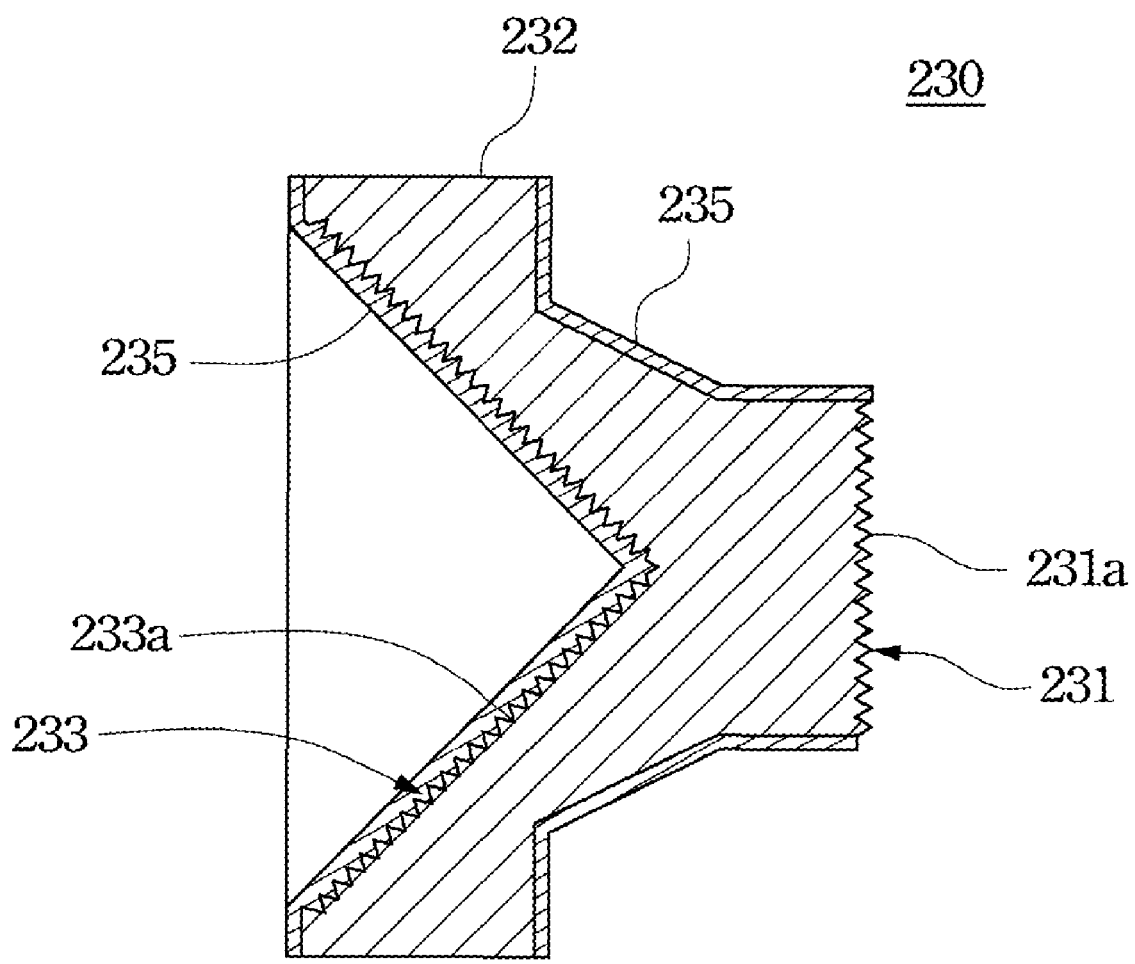
FIG. 2 is a cross-sectional view of a light guide element having light-uniformizing structures.

FIG. 2 is a cross-sectional view of a light guide element having light-uniformizing structures. The light guide element 230 includes a light-entering surface 231, a light-departing curved surface 232 and a light-reflecting curved surface 233. At least one of the light-entering surface 231 and the light-reflecting curved surface 233 has a light-uniformizing structure. In FIG. 2, the light-entering surface 231 and the light-reflecting curved surface 233 have the light-uniformizing structure 231a and the light-uniformizing structure 233a respectively. The two light-uniformizing structures 231a and 233a are, for example, surface microstructures, sandblasted surfaces or texture patterns for uniformizing the light L entering the light guide element 230 and the light L being reflected by the light-reflecting curved surface 233. Accordingly, the uniformity of the light L leaving the light guide element 230 through the light-departing curved surface 232 is further increased.

In addition to the light-uniformizing structures 231a and 233a, the light guide element 230 further includes a light-reflecting coating 235. The light-reflecting coating 235 covers a part of the surface of the light guide element 230 other than the light-entering surface 231 and light-departing curved surface 232, so as to reflect the light L toward the inside of the light guide element 230. Therefore, the problem of losing luminosity of the light L after traveling through the light guide element 230 can be avoided.

Figure 3A:
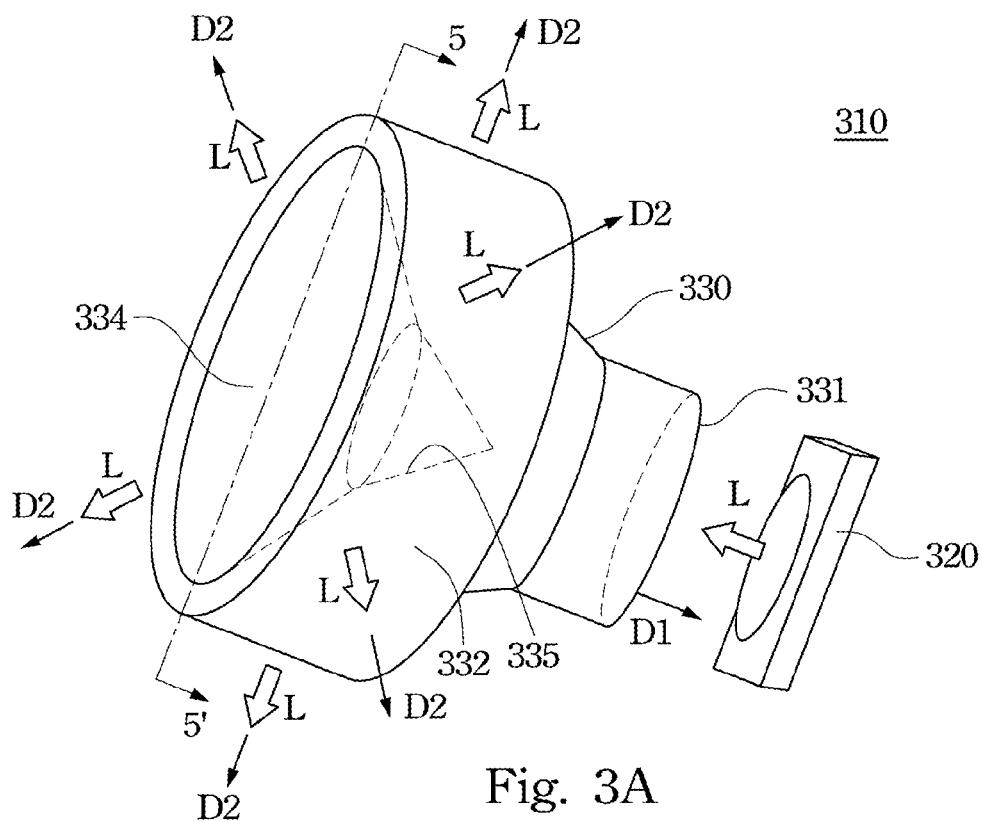
FIG. 3A is a three-dimensional diagram of a light source module according to another embodiment of the invention.
Figure 3B:
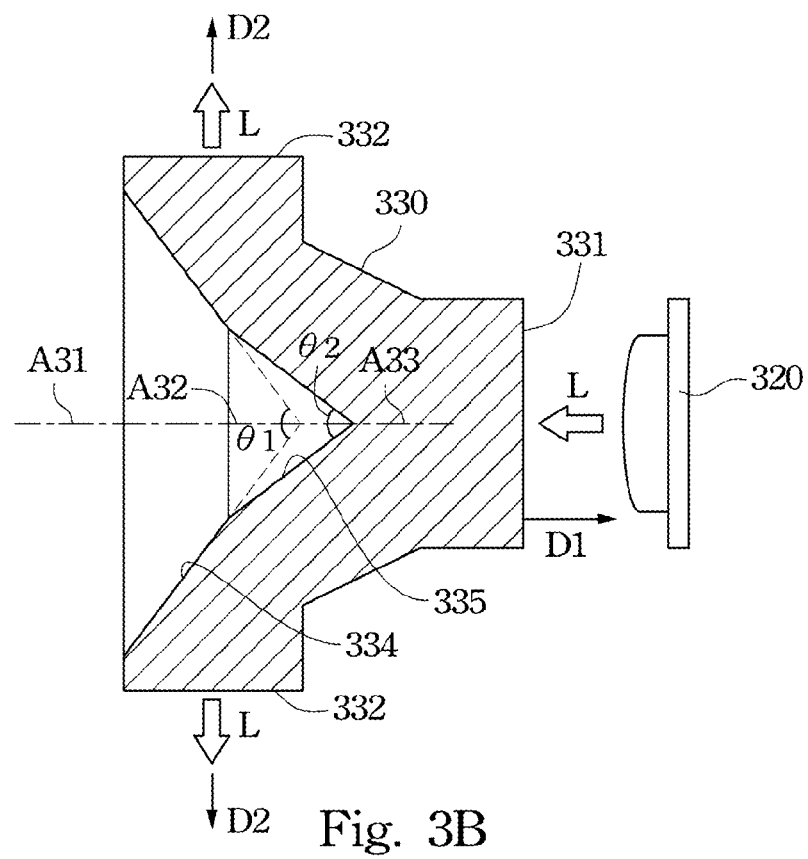
FIG. 3B is a cross-sectional view of the light guide element in FIG. 3A along line 5-5'.

FIG. 3A is a three-dimensional diagram of a light source module according to another embodiment of the invention. FIG. 3B is a cross-sectional view of the light guide element in FIG. 3A along line 5-5'. The light source module 310 includes a light source 320 for emitting the light L and a light guide element 330 disposed adjacent to the light source 320. The light guide element 330 includes a light-entering surface 331, a light-departing curved surface 332 and a light-reflecting curved surface. In the present embodiment, the light guide element 330 is exemplified by including two adjacent light-reflecting curved surfaces, namely a first curved surface 334 and a second curved surface 335 that are disposed next to each other.

The light-entering surface 331 is located on one side of the light guide element 330, and the light L enters the light guide element 330 by penetrating through the light-entering surface 331. The light L is then reflected by the two curved surfaces 334 and 335 to change its moving direction. The light-departing curved surface 332 is located on another side of the light guide element 330, and the light L, being reflected by the two curved surfaces 334 and 335, leaves the light guide element 330 by penetrating through the light-departing curved surface 332.

As shown in FIG. 3A, the light L penetrates through the light-entering surface 331 in its normal line direction D1. The light-departing curved surface 332 is a continuous circular surface of 360 degrees and has numerous radial normal line directions D2. These normal line directions D2 are approximately perpendicular to the normal line direction D1 of the light-entering surface 331. The reflected light L penetrates through the light-departing curved surface 332 in these radial normal line directions D2. More specifically, the light-departing curved surface 332 has a first central axis A31 being parallel to the normal line direction D1 of the light-entering surface 331.

In the present embodiment, the first curved surface 334 and the second curved surface 335 are respectively a first cone surface and a second cone surface, and respectively have a second central axis A32 and a third central axis A33. The second axis A32 is aligned with the third axis A33 and is parallel to the normal line direction D1 of light-entering surface 331. The vertex angle θ1 of the first cone is different from the vertex angle θ2 of the second cone. As a result, the slope rate of the first curved surface 334 to the second central axis A32 is different from that of the second curved surface 335 to the third central axis A33. This makes the two curved surfaces 334 and 335 reflect the light L by different angles, thus increasing the uniformity of the light L.

The light guide element 330 transforms the linear and single directional incident light L into a three-dimensional circular emergent light L. Consequently, the limitation of designing the light guide element 330 is reduced, and thus the applicability of the light source module 310 is increased. Moreover, at least one of the light-entering surface 331, the first curved surface 334 and the second curved surface 335 has a light-uniformizing structure to uniformizing the light L to increase the illumination quality of the light source module 310.

Although the light guide elements 130, 230 and 330 in the above-mentioned embodiments are exemplified by continuous circular structures of 360 degrees respectively, the design of the light guide element of the invention is not limited thereto. For example, the light guide element can also be a part of the continuous circular structures, such as a sector structure.

Figure 4A:
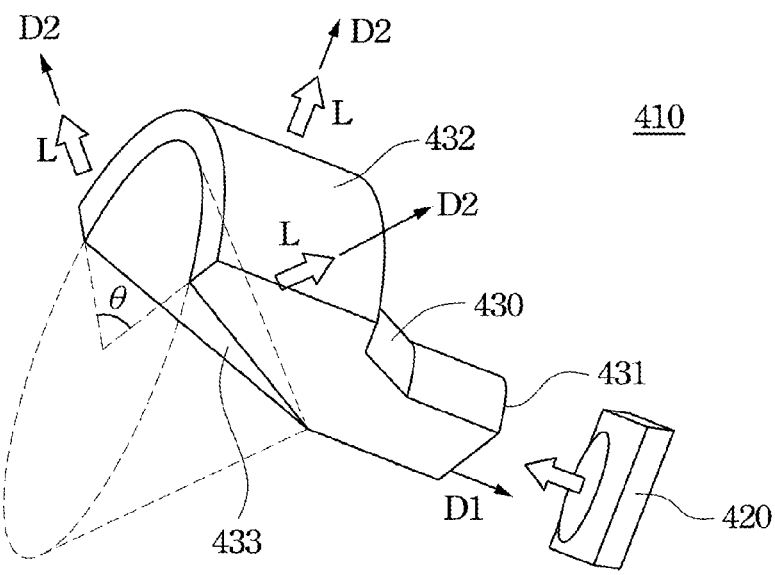
FIG. 4A is a three-dimensional diagram of a light source module according to another embodiment of the invention.
Figure 4B:
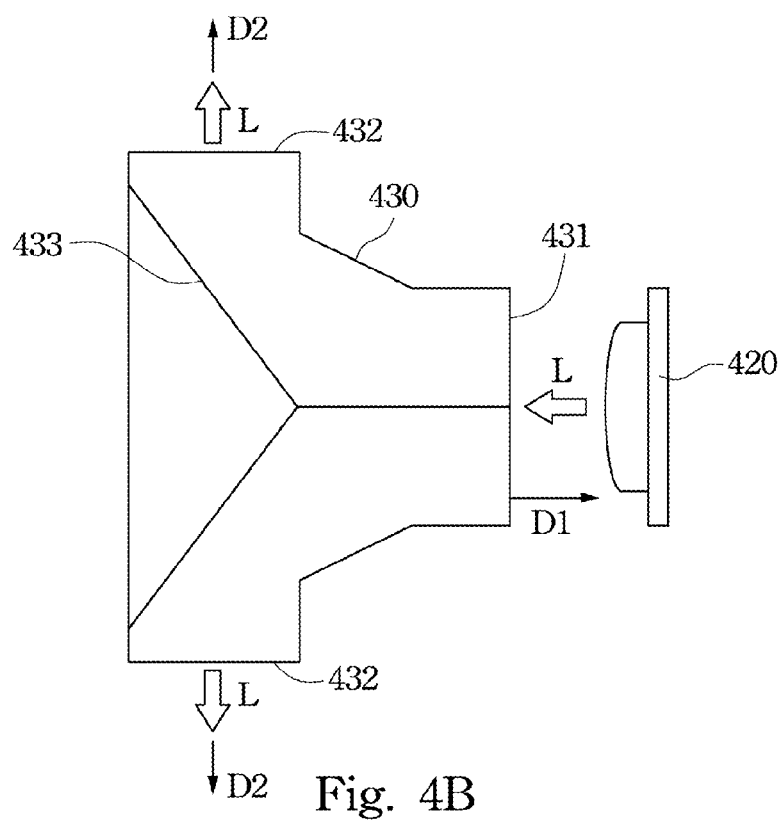
FIG. 4B is a bottom view of the light source module in FIG. 4A.

FIG. 4A is a three-dimensional diagram of a light source module according to another embodiment of the invention. FIG. 4B is a bottom view of the light source module in FIG. 4A. The light source module 410 includes a light source 420 for emitting light L and a light guide element 430 disposed adjacent to the light source element 420. The light guide element 430 includes a light-entering surface 431, a light-departing curved surface 432 and a light-reflecting curved surface 433. The light source module 410 of the present embodiment is exemplified by including one light-reflecting curved surface 433.

The light L enters the light guide element 430 by penetrating through the light-entering surface 431 in its normal line direction D1. As shown in FIG. 4A, the light-departing curved surface 432 is a part of a continuous circular surface, and the light-reflecting curved surface 433 is a part of a cone surface. For example, the light-departing curved surface 432 has a corresponding central angle θ of 120 degrees, and the light-reflecting curved surface 433 has the same corresponding central angle θ of 120 degrees. However, the central angle θ corresponding to the light-departing curved surface 432 and the light-reflecting curved surface 433 is not limited to 120 degrees. The central angle θ is adjustable according to actual requirement of products.

The light-departing curved surface 432 has numerous normal line directions D2 that are approximately perpendicular to the normal line direction D1 of the light-entering surface 431. After the light L being reflected by the light-reflecting curved surface 433, the reflected light L leaves the light-departing element 430 by penetrating through the light-departing curved surface 432 in the normal line directions D2. In this manner, the light guide element 430 transforms the linear and single directional incident light L into a three-dimensional arc emergent light L. Therefore the limitation of designing the light guide element 430 is reduced, and the applicability of the light source module 410 is increased.

Figure 5A:
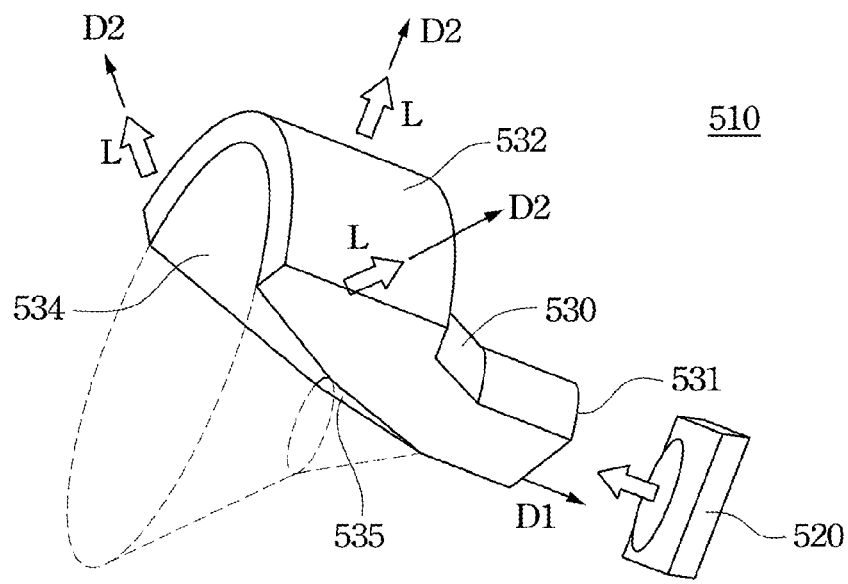
FIG. 5A is a three-dimensional diagram of a light source module according to yet another embodiment of the invention.
Figure 5B:
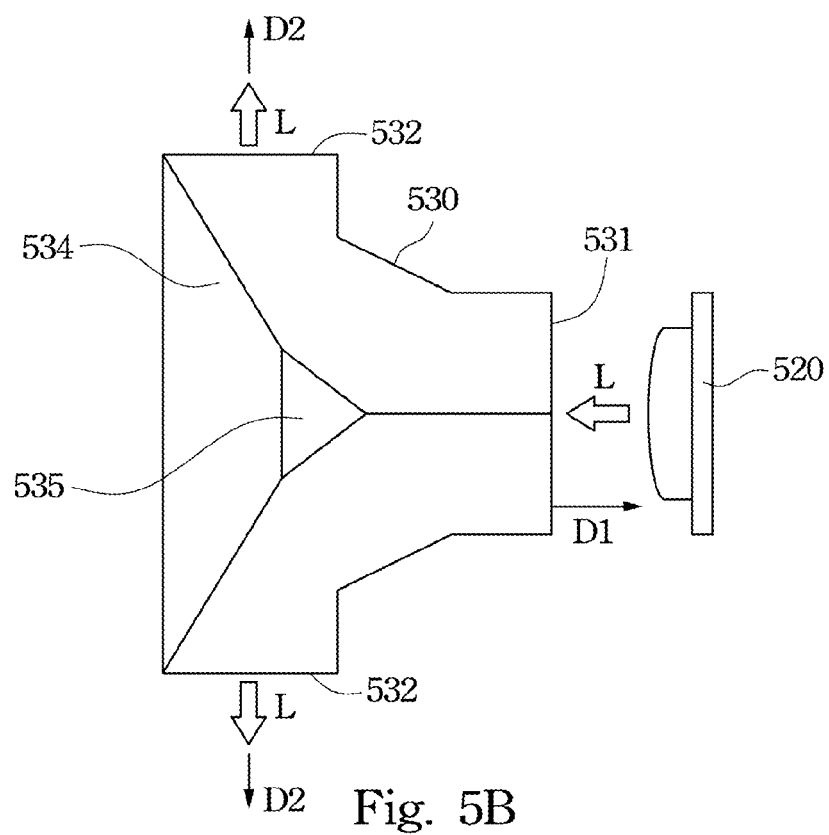
FIG. 5B is a bottom view of the light guide element in FIG. 5A.

FIG. 5A is a three-dimensional diagram of a light source module according to yet another embodiment of the invention. FIG. 5B is a bottom view of the light guide element in FIG. 5A. A light guide element 530 of the light source module 510 includes a light-entering surface 531, a light-departing curved surface 532, a first curved surface 534 and a second curved surface 535. The light L emitted from by the light source 520 penetrates through the light-entering surface 531 in the normal line direction D1 thereof, so as to enter the light guide element 530. The light-departing curved surface 532 is a part of a continuous circular surface. The first curved surface 534 is a part of a first cone surface and the second curved surface 535 is a part of a second cone surface.

The light-departing curved surface 532 has numerous radial normal line directions D2 being parallel to the normal line direction D1 of the light-entering surface 531. The light L entering the light guide element 530 is reflected by the first curved surface 534 and the second curved surface 535, and then penetrates through the light-departing curved surface 532 in these normal line directions D2. In this manner, the linear and single directional incident light L is transformed into a three-dimensional arc emergent light L, and the applicability of the light guide element 530 to different products is increased.

The light guide modules 110-510 in the above-described embodiments use the light guide elements 130-530 to reflect the light L. The reflected light L leaves the light guide elements 130-530 in the normal line directions D2 of the continuous circular light-departing curved surfaces 132, 232 and 332, or in the normal line directions D2 of the arc light-departing curved surface 432 and 532. The light guide elements 130-530, therefore, transform the linear and single-directional incident light L into the emergent light L in the form of a continuous circular surface or an arc surface. The limitation to the shape and the design of the light guide elements 110-510 can therefore be reduced, and consequently enhances the applicability of the light source modules 110-510 to different products.

Figure 6:
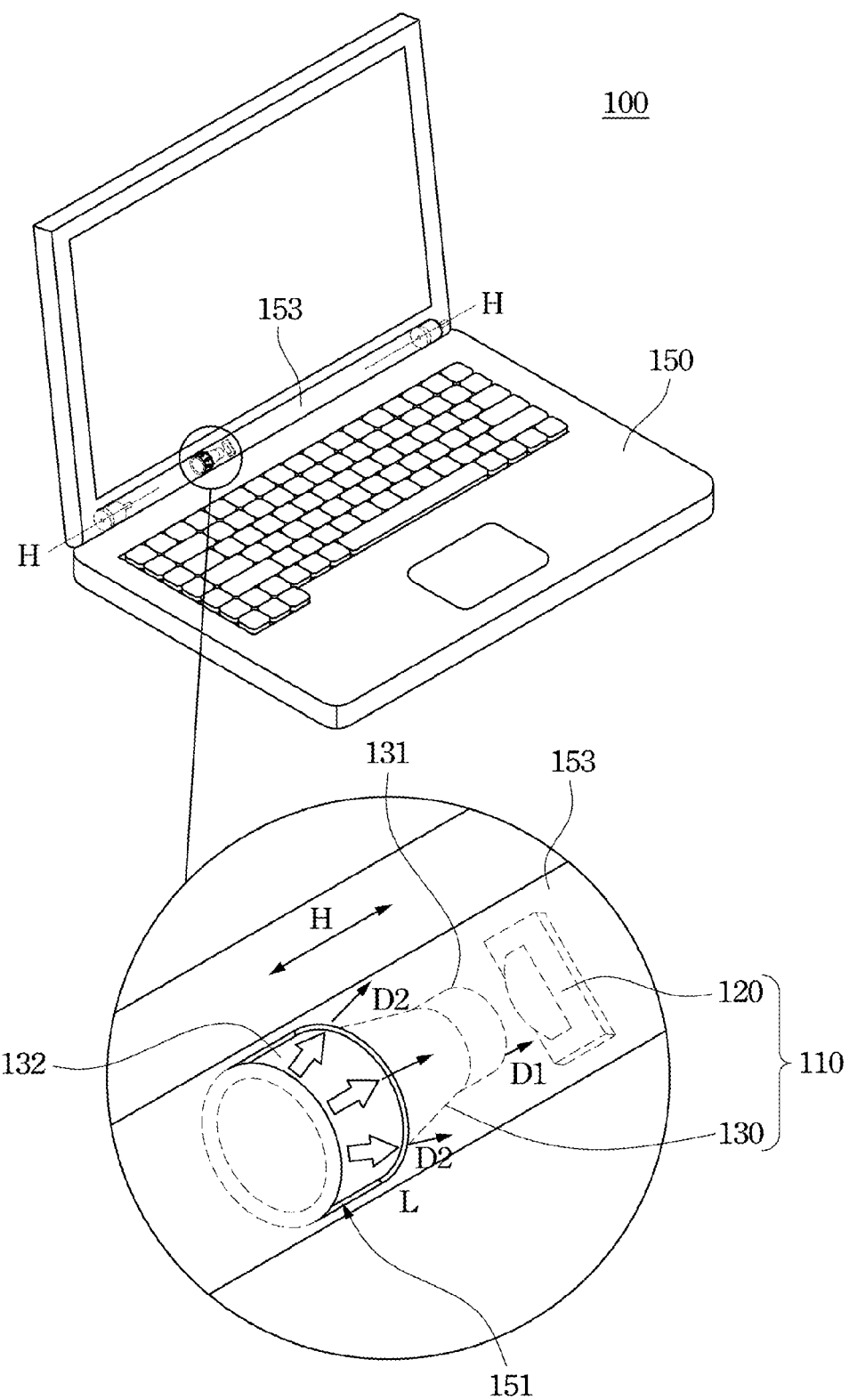
FIG. 6 is a three-dimensional view of an electronic device according one embodiment of the invention.

Practically, the light source modules 110-510 are applicable to electronic devices. Exemplarily, the detailed description is now made by using the light source module 110 of FIG. 1A in an electronic device, as shown in FIG. 6. FIG. 6 is a three-dimensional view of an electronic device according one embodiment of the invention. The electronic device 100 includes a housing component 150 and the light source module 110 disposed in the housing component 150. The housing component 150 has a light pervious portion 151, and the light source 120 of the light source module 110 is exemplified by a light emitting diode. The location of the light-departing curved surface 132 of the light guide element 130 corresponds to the light pervious portion 151. The light L leaves the light guide element 130 by penetrating through the light-departing curved surface 132 in the radial normal line directions D2, and penetrates through the light pervious portion 151.

The electronic device 100 is exemplified by a notebook computer and includes a main body, a cover portion and a hinge 180. The cover portion is pivotally connected to the main body through the hinge 180. The housing component 150 includes a hinge cover 153 for containing the hinge 180, and the light source module 110 is disposed in the hinge cover 153. In the present embodiment, the normal line direction D1 of the light-entering surface 131 is parallel to an axial direction H of the hinge 180. Correspondingly, the radial normal line directions D2 of the light-departing curved surface 132 are approximately perpendicular to the axial direction H of the hinge 180. The light pervious portion 151 is located on the hinge cover 153, and is exemplified by a through hole on the hinge cover 153 that exposes the light-departing curved surface 132 of the light guide element 130. However, the light pervious portion 151 is not merely limited to the through hole; in another embodiment, the light pervious portion 151 can also be made from a transparent glass, a semi-transparent plastic material or any other materials that allow the light L to penetrate through the hinge cover 153.

In the above-described light source module and electronic device using the same according to the embodiments of the invention, the light entering the light guide element is reflected by at least one light-reflecting curved surface. So that the light leaves the light guide element in the normal line directions of the light-departing curved surface, and being transformed into a three-dimensional circular or arc emergent light. Due to the fact that the normal line directions of the light-departing curved surface are approximately perpendicular to the normal line direction of the light-entering surface, the directions of the light entering and leaving the light guide element are not in the same plane. As a result, the shape and the design of the light guide element and the disposition of the light source module are no longer limited by the light-entering direction and the light-departing direction that are situated in the same plane. Further more, the applicability of the light source module to different products are enhanced, and the light uniformity is increased by at least one light-reflecting curved surface.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A light source module comprising:
   a light source for emitting a light; and
   a light guide element disposed adjacent to the light source and comprising:
   a light-entering surface on one side of the light guide element for receiving the light, wherein the light-entering surface has a light-uniformizing structure;
   a light-departing curved surface on another side of the light guide element, wherein the normal line directions of the light-departing curved surface are approximately perpendicular to the normal line direction of the light-entering surface; and
   a light-reflecting curved surface for reflecting the light through the light guide element so that the light leaves the light guide element in the normal line directions of the light-departing curved surface.

2. The light source module of claim 1, wherein the light-departing curved surface is a part of a continuous circular surface having a first central axis being parallel to the normal line direction of the light-entering surface.

3. The light source module of claim 2, wherein the light-reflecting curved surface is a part of a cone surface having a second central axis being parallel to the normal line direction of the light-entering surface.

4. The light source module of claim 2, wherein the light-reflecting curved surface comprises a first curved surface and a second curved surface that are disposed next to each other, and the first curved surface is a part of a first cone surface having a second central axis and the second curved surface is a part of a second cone surface having a third central axis, and the second central axis and the third central axis are parallel to the normal line direction of the light-entering surface.

5. The light source module of claim 4, wherein the first cone surface and the second cone surface have different vertex angles.

6. The light source module of claim 1, wherein the light-departing curved surface is a continuous circular surface having a first central axis being parallel to the normal line direction of the light-entering surface.

7. The light source module of claim 6, wherein the light-reflecting curved surface is a cone surface having a second central axis being parallel to the normal line direction of the light-entering surface.

8. The light source module of claim 6, wherein the light-reflecting curved surface comprises a first curved surface and a second curved surface that are disposed next to each other, and the first curved surface is a first cone surface having a second central axis and the second curved surface is a second cone surface having a third central axis, and the second central axis and the third central axis are parallel to the normal line direction of the light-entering surface.

9. The light source module of claim 8, wherein the first cone surface and the second cone surface have different vertex angles.

10. The light source module of claim 1, wherein the light-reflecting curved surface has a light-uniformizing structure.

11. The light source module of claim 1, wherein the light guide element further comprises:
    a light-reflecting coating covering a part of the surface of the light guide element other than the light-entering surface and the light-departing curved surface, so as to reflect the light toward the inside of the light guide element.

12. An electronic device comprising:
    a housing component having a light pervious portion; and
    a light source module disposed in the housing component comprising:
    a light source for emitting a light; and
    a light guide element disposed adjacent to the light source and comprising:
    a light-entering surface on one side of the light guide element for receiving the light, wherein the light-entering surface has a light-uniformizing structure;
    a light departing-curved surface on another side of the light guide element, wherein the normal line directions of the light-departing curved surface are approximately perpendicular to the normal line direction of the light-entering surface, and the location of the light-departing curved surface corresponds to the light pervious portion; and
    a light-reflecting curved surface for reflecting the light entering the light guide element so that the light leaves the light guide element in the normal line directions of the light-departing curved surface and penetrates through the light pervious portion.

13. The electronic device of claim 12, wherein the housing component comprises a hinge cover for containing a hinge, and the light source module is disposed in the hinge cover, and the light pervious portion is situated on the hinge cover.

14. The electronic device of claim 13, wherein the normal line direction of the light-entering surface is parallel to the axial direction of the hinge, and the normal line directions of the light-departing curved surface are approximately perpendicular to the axial direction of the hinge.

* * * * *